US012746829B2

(12) United States Patent
Chen et al.

(10) Patent No.: US 12,746,829 B2
(45) Date of Patent: Sep. 29, 2026

(54) INTERACTIVE FUNCTIONALITY FOR PHEV USERS TO REACH MINIMUM COMPREHENSIVE CONSUMPTION

(71) Applicant: FCA US LLC, Auburn Hills, MI (US)

(72) Inventors: Xi Chen, Shanghai (CN); Quan Gan, Shanghai (CN); Jieyun Wu, Shanghai (CN); Lin Wang, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 246 days.

(21) Appl. No.: 18/521,102

(22) Filed: Nov. 28, 2023

(65) Prior Publication Data

US 2025/0170905 A1 May 29, 2025

(51) Int. Cl.
*B60L 15/20* (2006.01)

(52) U.S. Cl.
CPC ....... *B60L 15/2045* (2013.01); *B60L 2240/42* (2013.01); *B60L 2250/16* (2013.01); *B60L 2260/26* (2013.01); *B60L 2260/54* (2013.01)

(58) Field of Classification Search
CPC ............. B60L 2260/54; B60L 2260/26; B60L 2250/16; B60L 2240/42; B60L 15/2045
See application file for complete search history.

(56) References Cited

U.S. PATENT DOCUMENTS

| | | | | |
|---|---|---|---|---|
| 6,209,672 B1 * | 4/2001 | Severinsky | ............ | B60K 6/442 180/65.23 |
| 7,013,205 B1 * | 3/2006 | Hafner | .................... | B60L 50/62 180/65.265 |
| 8,483,897 B2 | 7/2013 | Marus et al. | | |
| 8,508,067 B2 | 8/2013 | Song et al. | | |
| 8,729,727 B2 | 5/2014 | Kim et al. | | |
| 10,971,763 B2 | 4/2021 | Sung et al. | | |
| 2011/0166733 A1 * | 7/2011 | Yu | ........................... | B60L 58/12 180/65.265 |
| 2011/0282527 A1 * | 11/2011 | Inbarajan | ................ | B60L 53/68 320/109 |
| 2011/0307130 A1 * | 12/2011 | Gow | ....................... | B60L 3/102 701/22 |

(Continued)

FOREIGN PATENT DOCUMENTS

| | | |
|---|---|---|
| CN | 107433856 A | 12/2017 |
| CN | 116118709 A | 5/2023 |

*Primary Examiner* — Justin S Lee
(74) *Attorney, Agent, or Firm* — Jeremy J. Klobucar

(57) ABSTRACT

A comprehensive consumption control system for a plug-in hybrid electric (PHEV) vehicle includes a user interface configured to receive a user selection from a plurality of different comprehensive consumption modes for an electrified powertrain, the selected comprehensive consumption mode specifying a distributed usage of power sources for an electric motor and an engine, wherein the power source for the electric motor is state of charge (SOC) in a battery system and the power source for the engine is fuel in a fuel system and a controller in communication with the user interface and configured to receive, from the user interface, the selected comprehensive consumption mode for the electrified powertrain, and control the electrified powertrain based on the selected comprehensive consumption mode such that the electric motor and the engine use the battery system SOC and the fuel according to the distributed usage specified by the selected comprehensive consumption mode.

16 Claims, 2 Drawing Sheets

(56) References Cited

U.S. PATENT DOCUMENTS

| | | | | |
|---|---|---|---|---|
| 2014/0114512 | A1* | 4/2014 | Treharne | B60W 10/06<br>180/65.23 |
| 2015/0232082 | A1* | 8/2015 | Frank | B60W 30/182<br>180/65.265 |
| 2018/0118187 | A1* | 5/2018 | Frank | B60W 20/20 |

* cited by examiner

INTERACTIVE FUNCTIONALITY FOR PHEV USERS TO REACH MINIMUM COMPREHENSIVE CONSUMPTION

FIELD

The present application generally relates to plug-in hybrid electric (PHEV) vehicles and, more particularly, to techniques for providing interactive functionality for PHEV vehicle users to reach minimum comprehensive consumption.

BACKGROUND

PHEV vehicles are propulsively powered by an electrified powertrain that includes at least one electric motor and an internal combustion engine. The power source for the electric motor(s) is a high voltage battery system that has a state of charge (SOC) and supplies current to power the electric motor(s). The power source for the engine is a liquid fuel (gasoline, diesel, etc.) that is combined with air and combusted to generate torque. The engine could be configured either as a second propulsive power source or as a generator for recharging the battery system. The combined usage or consumption of both of these power sources (SOC/current and fuel) is referred to as the "comprehensive consumption" of the PHEV vehicle. Conventional PHEV vehicles are sub-optimal in that they first deplete or consume energy nearly all from the battery system, and then switch to the engine thereafter. Accordingly, while such conventional PHEV vehicles do work well for their intended purpose, there exists an opportunity for improvement in the relevant art.

SUMMARY

According to one example aspect of the invention, a comprehensive consumption control system for a plug-in hybrid electric (PHEV) vehicle having an electrified powertrain including an electric motor and an internal combustion engine is presented. In one exemplary implementation, the comprehensive consumption control system comprises a user interface configured to receive a user selection from a plurality of different comprehensive consumption modes for the electrified powertrain, the user-selected comprehensive consumption mode specifying a distributed usage of power sources for the electric motor and the engine, wherein the power source for the electric motor is state of charge (SOC) in a battery system and the power source for the engine is fuel in a fuel system, and a controller in communication with the user interface and configured to receive, from the user interface, the user-selected comprehensive consumption mode for the electrified powertrain, and control the electrified powertrain based on the user-selected comprehensive consumption mode such that the electric motor and the engine use the battery system SOC and the fuel according to the distributed usage specified by the user-selected comprehensive consumption mode.

In some implementations, none of the plurality of different comprehensive consumption modes for the PHEV vehicle indicates initial complete usage of the battery system SOC and the electric motor followed by subsequent usage of the fuel and the engine. In some implementations, the controller is further configured to control the electrified powertrain based on navigation information for a current trip of the PHEV vehicle. In some implementations, one of the plurality of different comprehensive consumption modes is a minimum monetary cost for the usage of the power sources. In some implementations, one of the plurality of different comprehensive consumption modes is a minimum emissions cost for the usage of the power sources. In some implementations, one of the plurality of different comprehensive consumption modes is a minimum energy cost for the usage of the power sources.

In some implementations, the energy cost for the usage of the fuel and the engine considers both operation of the engine as a propulsive torque generator for propulsion of the PHEV vehicle and as an SOC/current generator for recharging the battery system. In some implementations, the plurality of different comprehensive consumption modes include (i) a minimum monetary cost for the usage of the power sources, (ii) a minimum emissions cost for the usage of the power sources, and (iii) a minimum energy cost for the usage of the power sources. In some implementations, the plurality of different comprehensive consumption modes consist of (i) a minimum monetary cost for the usage of the power sources, (ii) a minimum emissions cost for the usage of the power sources, and (iii) a minimum energy cost for the usage of the power sources.

According to another example aspect of the invention, a comprehensive consumption control method for a PHEV vehicle having an electrified powertrain including an electric motor and an internal combustion engine is presented. In one exemplary implementation, the comprehensive consumption control method comprises receiving, by a user interface of the PHEV vehicle, a user selection from a plurality of different comprehensive consumption modes for the electrified powertrain, the user-selected comprehensive consumption mode specifying a distributed usage of power sources for the electric motor and the engine, wherein the power source for the electric motor is SOC in a battery system and the power source for the engine is fuel in a fuel system, receiving, by a controller of the PHEV vehicle and from the user interface, the user-selected comprehensive consumption mode for the electrified powertrain, and controlling, by the controller, the electrified powertrain based on the user-selected comprehensive consumption mode such that the electric motor and the engine use the battery system SOC and the fuel according to the distributed usage specified by the user-selected comprehensive consumption mode.

In some implementations, none of the plurality of different comprehensive consumption modes for the PHEV vehicle indicates initial complete usage of the battery system SOC and the electric motor followed by subsequent usage of the fuel and the engine. In some implementations, the controller is further configured to control the electrified powertrain based on navigation information for a current trip of the PHEV vehicle. In some implementations, one of the plurality of different comprehensive consumption modes is a minimum monetary cost for the usage of the power sources. In some implementations, one of the plurality of different comprehensive consumption modes is a minimum emissions cost for the usage of the power sources. In some implementations, one of the plurality of different comprehensive consumption modes is a minimum energy cost for the usage of the power sources.

In some implementations, the energy cost for the usage of the fuel and the engine considers both operation of the engine as a propulsive torque generator for propulsion of the PHEV vehicle and as an SOC/current generator for recharging the battery system. In some implementations, the plurality of different comprehensive consumption modes include (i) a minimum monetary cost for the usage of the power sources, (ii) a minimum emissions cost for the usage of the power sources, and (iii) a minimum energy cost for the usage of the power sources.

In some implementations, the plurality of different comprehensive consumption modes consist of (i) a minimum monetary cost for the usage of the power sources, (ii) a minimum emissions cost for the usage of the power sources, and (iii) a minimum energy cost for the usage of the power sources.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, the combined usage or consumption of multiple power sources-battery system state of charge (SOC) or current for an electric motor and liquid fuel (gasoline, diesel, etc.) for an internal combustion engine—is referred to as the "comprehensive consumption" of a plug-in hybrid electric (PHEV) vehicle. Conventional PHEV vehicles are sub-optimal in that they first deplete or consume energy nearly all from the battery system, and then switch to the engine thereafter. Further, the only conventional user-customizable functionality is enablement and disablement of a "energy saving mode," which allows for adjustment of a target SOC for the battery system to be depleted to. As such, the user (e.g., the driver) is not able to customize the PHEV vehicle's comprehensive consumption, such as to maintain or reserve battery system SOC for a future segment of city/urban driving following an initial segment of highway and/or to reduce or minimize carbon dioxide ($CO_2$) emissions.

Accordingly, improved techniques for providing interactive functionality for PHEV vehicle users to reach minimum comprehensive consumption are presented herein. A user (e.g., a driver) is able to select, via a user interface (e.g., a touch display) of the PHEV vehicle, from one of a plurality of different comprehensive consumption modes. Three particular examples of these comprehensive consumption modes are (i) a minimum monetary cost for the usage of the power sources, (ii) a minimum emissions cost for the usage of the power sources, and (iii) a minimum energy cost for the usage of the power sources. In some implementations, the energy cost considers both operation of the engine as a propulsive torque generator for propulsion of the PHEV vehicle and as an SOC/current generator for recharging the battery system. In some implementations, the distributed control/operation of the electric motor and the engine is based further on navigation information for a current vehicle trip.

Figure 1:
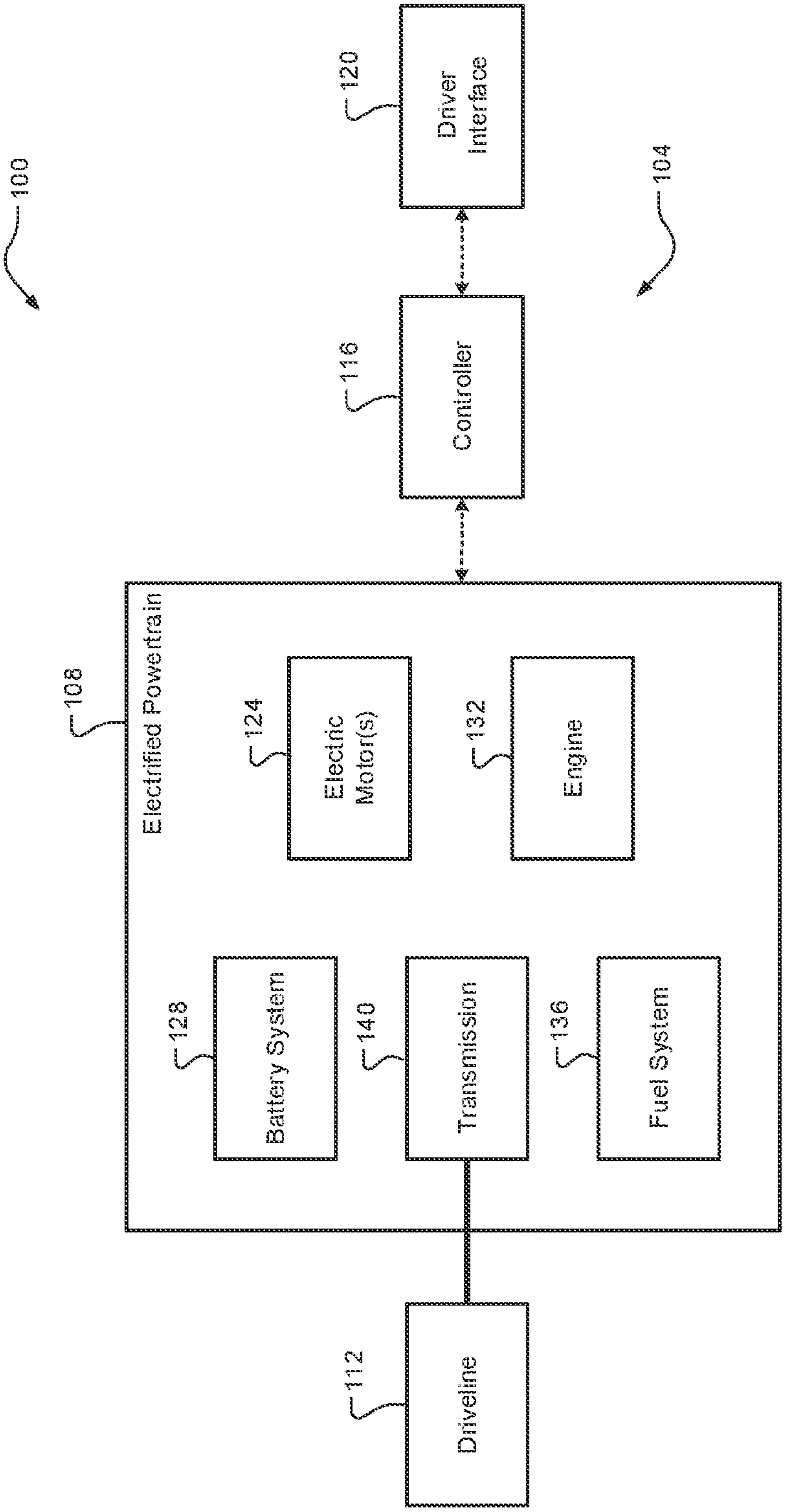
FIG. 1 is a functional block diagram of a plug-in hybrid electric (PHEV) vehicle having an example comprehensive consumption control system according to the principles of the present application.

Referring now to FIG. 1, a functional block diagram of an PHEV vehicle 100 having an example comprehensive consumption control system 104 according to the principles of the present application is illustrated. The PHEV vehicle 100 could be any suitable type of PHEV vehicle having a both an engine and an electric motor (e.g., a range-extended electrified vehicle, or REEV). The PHEV vehicle 100 primarily includes an electrified powertrain 108, a driveline 112, a controller 116, and a user interface 120. The electrified powertrain 108 includes one or more electric motors 124 (hereinafter, "electric motor 124") configured to generate torque using power (i.e., electrical energy, or current) provided by a high voltage battery pack or system 128 having a SOC that varies between minimum and maximum values (i.e., percentages). Non-limiting examples of the battery cells chemistries/configurations in the battery system 128 include lithium-ion (Li-ion) and lithium iron phosphate ($LiFePO_4$, or "LFP").

The electrified powertrain 108 also includes an engine 132 configured to combust a mixture of air and liquid fuel from a fuel system 136 to drive pistons (not shown) and generate torque at a crankshaft (not shown). The torque generated by the engine 132 could be used for vehicle propulsion, to recharge the battery system 132 or some combination thereof. The torque from the electric motor 124 (and, in some cases, the engine 132) is transferred by a transmission 140 (e.g., a multi-speed automatic transmission) to the driveline 112 for vehicle propulsion. The driveline 112 includes any suitable driveline components including, but not limited to, differentials, axles/driveshafts, transfer cases, and wheels. The controller 116 is configured to control the electrified powertrain 108 such that it generates a total amount of torque to satisfy a driver torque request (e.g., provided via the user interface 120, such as an accelerator pedal). The control of the electrified powertrain 108 includes distributed control of the electric motor 124 and the engine 132 via their respective power sources.

The controller 116 and the user interface 120 are also configured to perform at least a portion of the techniques of the present application. More specifically, the user interface 120 could be include an input/output device (e.g., a touch display) configured to receive a user selection from a plurality of different comprehensive consumption modes for the electrified powertrain 108. This user-selected comprehensive consumption mode specifies a distributed usage of power sources for the electric motor 124 and the engine 132, wherein the power source for the electric motor 124 is the SOC/current from the battery system 128 and the power source for the engine 132 is the fuel in the fuel system 136.

The controller 116 is configured to receive the user-selected comprehensive consumption mode and based thereon control the electrified powertrain 108 such that the electric motor 124 and the engine 132 use the battery system SOC and the fuel according to the distributed usage specified by the user-selected comprehensive consumption mode. These comprehensive consumption modes are different than a conventional mode specifying initial complete usage of the electric motor/battery system SOC followed by subsequent usage of the engine/fuel.

In some implementations, the controller 116 is further configured to control the electrified powertrain 108 based on navigation information for a current trip of the electrified vehicle 100. For example, the controller 116 could be able to leverage knowing upcoming road segments and their attributes (speed limits, road grade, low/no emissions zones, etc.) and use this information to adjust the user-selected comprehensive consumption mode or to intelligently distribute the usage of the power sources and their respective devices during the electrified vehicle's trip. Three specific comprehensive consumption modes are envisioned, although it would be appreciated that there could be additional comprehensive consumption modes (e.g., including a fully user-customizable comprehensive consumption mode). These three comprehensive consumption modes include (i) a minimum monetary cost for the usage of the power sources, (ii) a minimum emissions cost for the usage of the power sources, and (iii) a minimum energy cost for the usage of the power sources. In one exemplary implementation, the plurality of different comprehensive consumption modes consists of only these three different comprehensive consumption modes.

Depending on the powertrain configuration, the energy cost for the usage of the engine/fuel could consider both operation of the engine 132 as a torque generator for propulsion of the PHEV vehicle 100 and as an SOC/current generator for recharging the battery system 128. The "minimum monetary cost" for the usage of the power sources refers to optimizing the total monetary cost, considering both fuel cost (e.g., dollars per gallon or liter) and electricity cost (e.g., dollars per kilowatt-hour, or kWh). This could be optimized, for example, over the course of the entire PHEV vehicle trip. The "minimum emissions cost" for the usage of the power sources refers to optimizing (i.e., eliminating or mitigating) emissions, such as $CO_2$ emissions (e.g., from well-to-tank). This could be optimized, for example, over the course of the entire PHEV vehicle trip. Lastly, the "minimum energy cost" for the usage of the power sources refers to optimizing the total energy cost (e.g., kWh, including fuel consumption converted to kWh). Again, this could be optimized, for example, over the course of the entire PHEV vehicle trip. These different modes provide the user (e.g., the driver) with increased flexibility to adjust their comprehensive consumption as desired, such as to meet their own desired goals.

Figure 2:
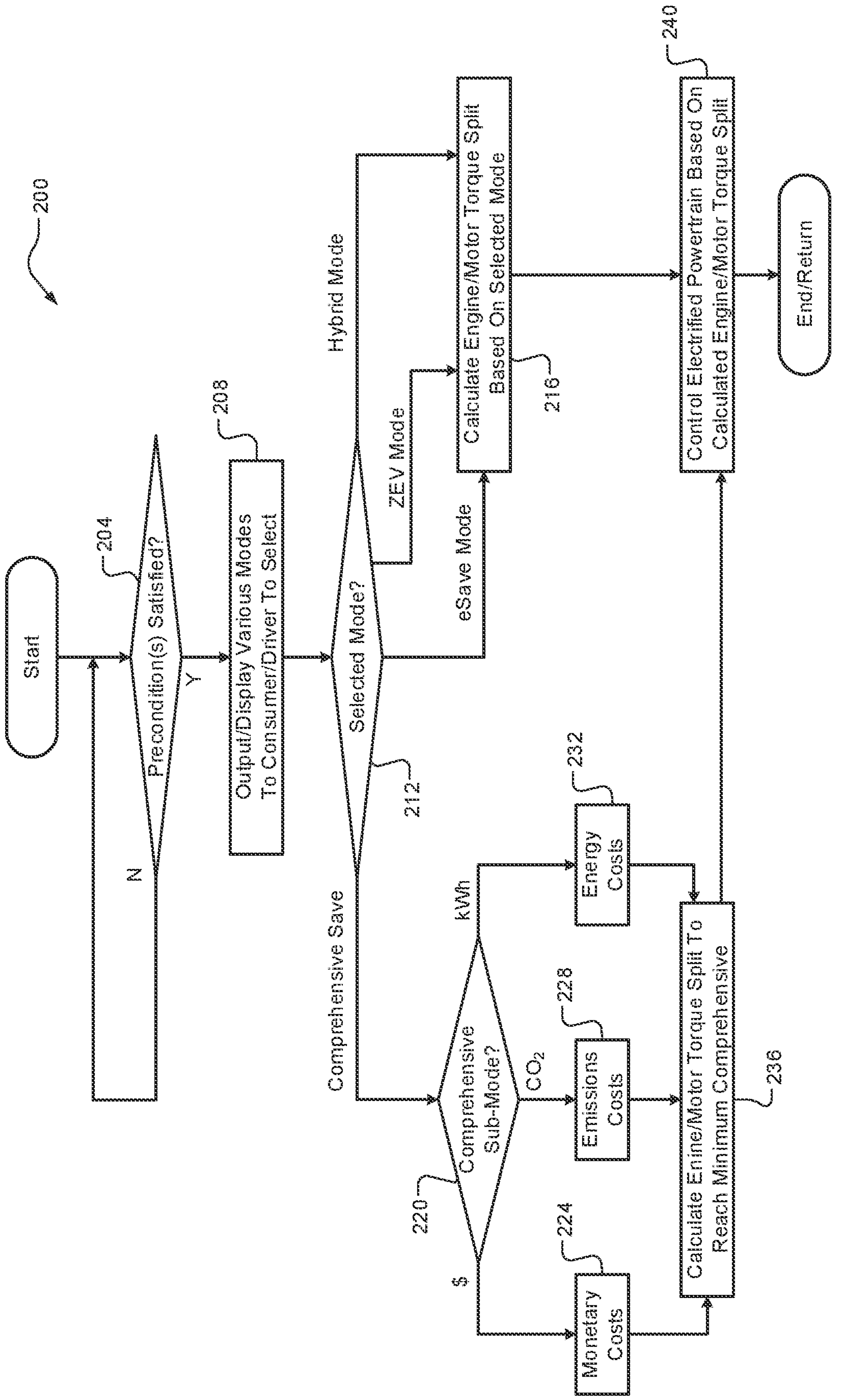
FIG. 2 is a flow diagram of an example comprehensive consumption control method for a PHEV according to the principles of the present application.

Referring now to FIG. 2, a flow diagram of an example comprehensive consumption control method 200 for a PHEV vehicle according to the principles of the present application is illustrated. While the PHEV vehicle 100 and its components are specifically referenced for illustrative/descriptive purposes, it will be appreciated that the method 200 could be applicable to any suitably configured PHEV vehicle. At optional 204, the controller 116 determine whether a set of one or more preconditions are satisfied. These one or more preconditions could include, for example, the PHEV vehicle 100 being powered up/running and there being no malfunctions present that would otherwise inhibit or prevent the execution of the techniques of the present application (powertrain malfunction, user interface malfunction, lack of sufficient navigation information, etc.). For example, this operation 204 could include the gathering/collecting of navigation information for the current trip of the PHEV vehicle 100. When satisfied, the method 200 proceeds to 208. Otherwise, the method 200 ends or returns to 204.

At 208, the controller 116 communicates with the user interface 120 such that information relative to the plurality of different modes is displayed to the user/driver. These modes, for example, could include a comprehensive save or comprehensive consumption mode, an energy saver (eSave) mode, a zero emissions vehicle (ZEV) mode, and a hybrid mode. For the eSave mode, only the target SOC for the battery system 128 is adjusted. For the ZEV and hybrid modes, electricity (batter system 128) usage is prioritized. At 212, the controller 116 receives, via the user interface 120, a user-selected comprehensive consumption mode from the plurality of different comprehensive consumption modes.

When one of the eSave mode, the ZEV mode, and the hybrid mode are selected by the user/driver, the method 200 proceeds to 216 where the controller 116 calculates the engine/motor torque split accordingly and the method 200 then proceeds to 240. When the comprehensive save or comprehensive consumption mode is selected, at 212, the method 200 proceeds to 220 where three more specific comprehensive sub-modes are displayed by the controller 116 to the user/driver via the user interface 120.

The user/driver then selects a particular comprehensive sub-mode from minimized monetary ($) costs 224, minimized emissions ($CO_2$) costs 228, and minimized energy (kWh) costs 232. At 236, the controller 116 calculates the engine/motor torque split to reach minimum comprehensive consumption according to the user-selected comprehensive consumption mode. Finally, at 240, the controller 116 controls the electrified powertrain 108 based on the calculated engine/motor torque split at 216 or 236. As previously mentioned, this includes controlling the distribution between the electric motor 124 and the SOC/current from the battery system 128 and the engine 132 and the fuel from the fuel system 136. The method 200 then ends or returns to 204, which could also include the controller 116 transitioning back to a normal/default distribution of electric motor/battery system SOC and engine/fuel.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A comprehensive consumption control system for a plug-in hybrid electric (PHEV) vehicle having an electrified powertrain including an electric motor and an internal combustion engine, the comprehensive consumption control system comprising:

a user interface configured to receive a user-selected comprehensive consumption mode from a plurality of different comprehensive consumption modes for the electrified powertrain, each comprehensive consumption mode specifying a different distributed usage of power sources for the electric motor and the engine, wherein the power source for the electric motor is state of charge (SOC) in a battery system and the power source for the engine is fuel in a fuel system, and wherein none of the plurality of different comprehensive consumption modes for the PHEV vehicle indicates initial full usage of the battery system SOC and the electric motor followed by subsequent usage of the fuel and the engine; and a controller in communication with the user interface and configured to:

receive, from the user interface, the user-selected comprehensive consumption mode for the electrified powertrain; and control the electrified powertrain based on the user-selected comprehensive consumption mode such that the electric motor and the engine use the battery system SOC and the fuel according to the distributed usage specified by the user-selected comprehensive consumption mode, wherein each of the plurality of different comprehensive consumption modes defines only simultaneous usage periods of both (i) the electric motor and the SOC in the battery system and (ii) the engine and the fuel in the fuel system.

2. The comprehensive consumption control system of claim 1, wherein the controller is further configured to control the electrified powertrain based on navigation information for a current trip of the PHEV vehicle.

3. The comprehensive consumption control system of claim 1, wherein one of the plurality of different comprehensive consumption modes is a minimum monetary cost for the usage of the power sources.

4. The comprehensive consumption control system of claim 1, wherein one of the plurality of different comprehensive consumption modes is a minimum emissions cost for the usage of the power sources.

5. The comprehensive consumption control system of claim 1, wherein one of the plurality of different comprehensive consumption modes is a minimum energy cost for the usage of the power sources.

6. The comprehensive consumption control system of claim 5, wherein the energy cost for the usage of the fuel and the engine considers both operation of the engine as a propulsive torque generator for propulsion of the PHEV vehicle and as an SOC/current generator for recharging the battery system.

7. The comprehensive consumption control system of claim 1, wherein the plurality of different comprehensive consumption modes include:

(i) a minimum monetary cost for the usage of the power sources;

(ii) a minimum emissions cost for the usage of the power sources; and (iii) a minimum energy cost for the usage of the power sources.

8. The comprehensive consumption control system of claim 1, wherein the plurality of different comprehensive consumption modes consist of:

(i) a minimum monetary cost for the usage of the power sources;

(ii) a minimum emissions cost for the usage of the power sources; and (iii) a minimum energy cost for the usage of the power sources.

9. A comprehensive consumption control method for a plug-in hybrid electric (PHEV) vehicle having an electrified powertrain including an electric motor and an internal combustion engine, the comprehensive consumption control method comprising:

receiving, by a user interface of the PHEV vehicle, a user-selected comprehensive consumption mode from a plurality of different comprehensive consumption modes for the electrified powertrain, each comprehensive consumption mode specifying a different distributed usage of power sources for the electric motor and the engine, wherein the power source for the electric motor is state of charge (SOC) in a battery system and the power source for the engine is fuel in a fuel system, and wherein none of the plurality of different comprehensive consumption modes for the PHEV vehicle indicates initial full usage of the battery system SOC and the electric motor followed by subsequent usage of the fuel and the engine;

receiving, by a controller of the PHEV vehicle and from the user interface, the user-selected comprehensive consumption mode for the electrified powertrain; and controlling, by the controller, the electrified powertrain based on the user-selected comprehensive consumption mode such that the electric motor and the engine use the battery system SOC and the fuel according to the distributed usage specified by the user-selected comprehensive consumption mode, wherein each of the plurality of different comprehensive consumption modes defines only simultaneous usage periods of both (i) the electric motor and the SOC in the battery system and (ii) the engine and the fuel in the fuel system.

10. The comprehensive consumption control method of claim 9, wherein the controller is further configured to control the electrified powertrain based on navigation information for a current trip of the PHEV vehicle.

11. The comprehensive consumption control method of claim 9, wherein one of the plurality of different comprehensive consumption modes is a minimum monetary cost for the usage of the power sources.

12. The comprehensive consumption control method of claim 9, wherein one of the plurality of different comprehensive consumption modes is a minimum emissions cost for the usage of the power sources.

13. The comprehensive consumption control method of claim 9, wherein one of the plurality of different comprehensive consumption modes is a minimum energy cost for the usage of the power sources.

14. The comprehensive consumption control method of claim 13, wherein the energy cost for the usage of the fuel and the engine considers both operation of the engine as a propulsive torque generator for propulsion of the PHEV vehicle and as an SOC/current generator for recharging the battery system.

15. The comprehensive consumption control method of claim 9, wherein the plurality of different comprehensive consumption modes include:

(i) a minimum monetary cost for the usage of the power sources;

(ii) a minimum emissions cost for the usage of the power sources; and (iii) a minimum energy cost for the usage of the power sources.

16. The comprehensive consumption control method of claim 9, wherein the plurality of different comprehensive consumption modes consist of:

(i) a minimum monetary cost for the usage of the power sources;

(ii) a minimum emissions cost for the usage of the power sources; and (iii) a minimum energy cost for the usage of the power sources.

* * * * *